Jan. 27, 1953  J. C. EILER ET AL  2,626,649
TIRE TREAD
Filed Feb. 15, 1947  2 SHEETS—SHEET 1
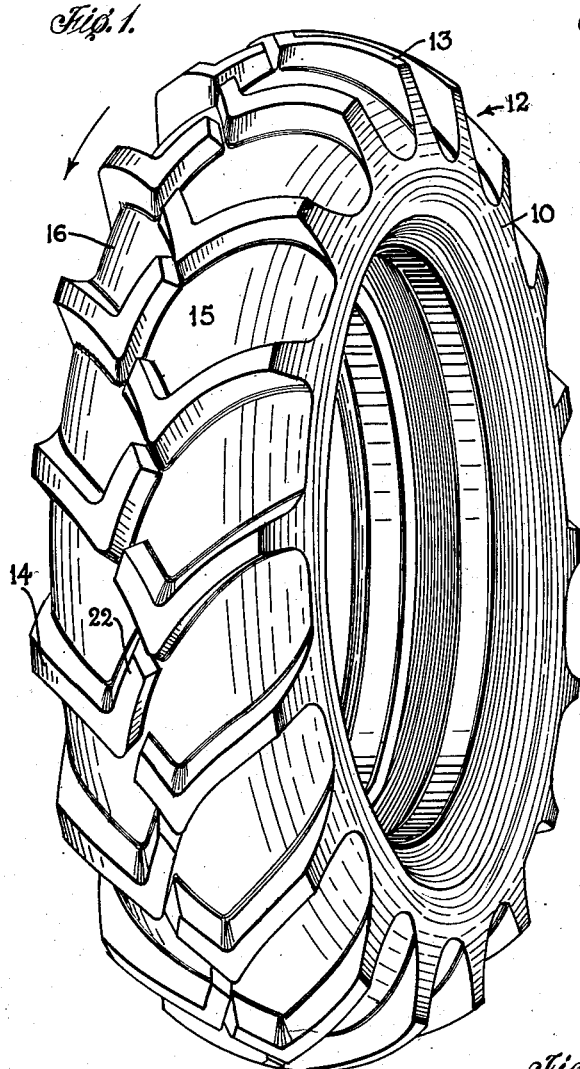
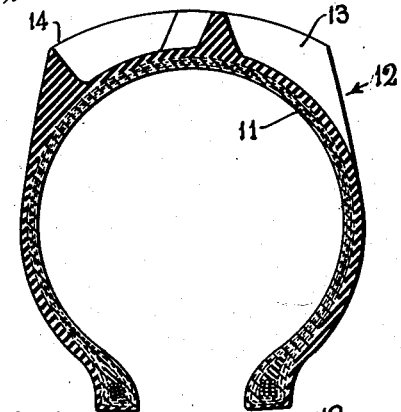
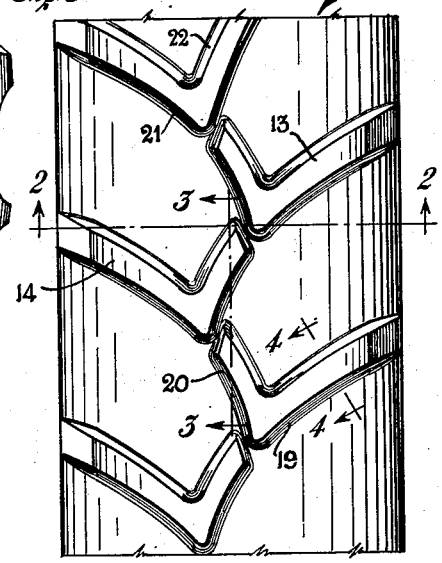
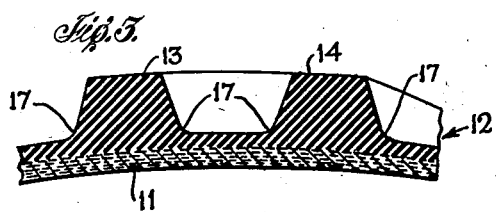
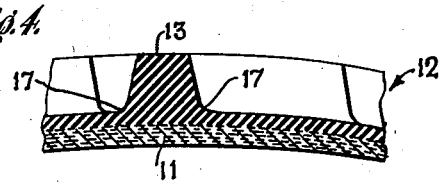
INVENTORS
JOSEPH C. EILER
AND
WALTER E. LYON
BY Ely + Frye
ATTORNEYS Patented Jan. 27, 1953

2,626,649

UNITED STATES PATENT OFFICE 2,626,649

TIRE TREAD

Joseph C. Eiler and Walter E. Lyon, Akron, Ohio, assignors to The Firestone Tire & Rubber Company, Akron, Ohio, a corporation of Ohio Application February 15, 1947, Serial No. 728,860

11 Claims. (Cl. 152—209)

This invention relates to agricultural tractor tires adapted to operate on readily deformable surfaces or soils having a large variation of texture and moisture content.

Heretofore agricultural tractor tires in common use have had tread constructions comprising high narrow widely spaced bars as traction elements. Such constructions are disclosed in Hale Patents No. 2,113,527 dated April 5, 1938, and No. 2,203,617 dated June 4, 1940, and Coben Patent No. 2,324,996 dated July 20, 1943.

An object of the present invention is to devise an agricultural tractor tire provided with a new and different tread construction affording the required draw bar pull for operation of farm implements on various types of sod, soil and muddy ground.

A further object is to provide such a tire tread with separate traction bars curved like the contour of a plow-share whereby the traction bars will scour properly to shed muddy soils for preventing clogging of the traction tread. Still another object is to provide such a tire tread with discontinuous traction bars for greater flexibility of the tread, each bar defining a dihedral having generally a check-mark or plow-share shape and being staggered on the opposite sides of the center line of the tread with the apex of one tread bar circumferentially overlapping the legs of the adjacent tread bar on the opposite side of the tread to effect uninterrupted contact with the ground for smooth tractive power application and non-bumpy roadability.

A further object of the present invention is to provide an agricultural tire tread with dihedral traction bars with their apices pointing forwardly relative to the normal rotation of the tire so that said apices of the traction bars will readily pierce sod, or firm soil, thereby acting as opening wedges for the bars to penetrate sod, firm earth, cover crops, or the like.

Other and further objects will become readily apparent from the following description, when considered in connection with the accompanying drawings in which:

Fig. 1 is a perspective view of a pneumatic tire embodying the present invention;

Fig. 2 is a sectional view on the line 2—2 of Fig. 5;

Fig. 3 is a sectional view on the line 3—3 of Fig. 5 drawn to larger scale;

Fig. 4 is a sectional view on the line 4—4 of Fig. 5 drawn to larger scale;

Fig. 5 is a plan view of a circumferential portion of the tire of the invention;

Figure 6:
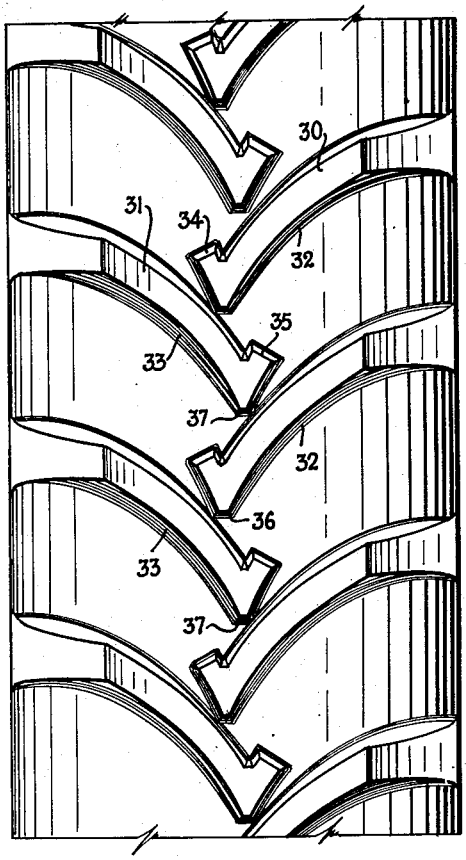
Fig. 6 is the same as Fig. 5 except a modified form of the tread design is shown.

The present invention contemplates an improved tire construction particularly adapted for use on agricultural tractors and especially to insure the development of a strong draw bar pull on relative light weight modern farm tractors during operation on sod, firm soil, crusted soil, or other types of soils which resist penetration by tire traction elements.

Referring to the drawings, an embodiment of the invention is shown in the form of a tire 10 having the usual rubberized fabric body 11 and tread 12. As illustrated in the drawings, the tread has a traction portion made up of two series of circumferentially spaced traction bars 13 and 14. The bars 13 of one series are arranged substantially on one side of the center line of the tread, or tire, and the bars 14 of the other series lie substantially on the opposite side of said center line. As used in this specification and claims the reference to "the centerline of the tread" is to be understood to refer to a continuous circumferentially extending line on the tread surface which line lies in a plane which plane is perpendicular to the axis of the tire and divides the tire into two equal parts. The bars of each series are circumferentially spaced by wide, deep intervening grooves 15 and 16, respectively.

The bars 13 and 14 are identical except that they may be referred to as left and right hand bars in that they form identical patterns on opposite sides of the tire tread center line. These bars are tapered radially and are filleted at the base as indicated at 17 in Figs. 3 and 4. It will also be noted by reference to the drawings that the taper of the bars is such as to provide relatively narrow bars at their ground contact surfaces as compared to their base portions. By this construction of the bars, narrow soil penetrating edges are provided, which edges are backed up by a sufficient volume of rubber, or other material, if such is used, to impart stability to the ground contact portions of the bars, whereby said narrow portions may be subjected to heavy loads without turning over, thereby making it possible to sink the bars into firmer ground than could otherwise be done.

In the embodiment shown in Figs. 1 to 5 inclusive, the bars 13 of one series extend obliquely inwardly from one side of the tire to a point close to, but not across, the longitudinal center line of the crown of the tire at which point the bars turn angularly backward and extend a short distance obliquely across said center line as will best be seen by reference to Fig. 5. By further reference to the drawings, it will be seen that the traction bars 13 and 14 each comprise a long and a short leg 19, 20 and 21, 22 respectively, also best shown in Fig. 5. The long legs 19 and 21 follow an arcuate course from the sides of the tread to the points at which the bars turn to form said short legs which extend obliquely across the center line of the tire. The short legs 20 and 22 also follow an arcuate course; however, it is to be understood that if desired, both or either of the legs of a bar 13 or 14 may extend in a straight course when viewed from a projection on a plane transverse of the tire. The angularity of the legs of bars in each series is such that the short legs meet the inner ends of the long legs forming a V, or at such angle as to give the appearance of barbs at the ends of the long legs all of which point in the direction of the normal rotation of the tire. A tread design of this type is known as a "directional" or "one way" tread which means that it is more effective when mounted on a vehicle when the vehicle is run in one direction than when it is run in the opposite direction. The present tread is designed to be mounted to run in the direction indicated by the arrow in Fig. 1. Thus it will be seen that points of the barbs of the bars 13 and 14 are the first part of said bars to contact the ground. It will also be seen that as the points of these barbs are pressed into the soil and the tire is revolved, the long and short legs of the bars together form a shape which will function very similar to a plow-share in the soil. This is an important feature of the invention and to facilitate this plow share action, applicants provide bars having narrow ground contact surface and have opened up the center of the tread by avoiding the usual straight or angular center rib commonly occurring in tractor tire treads. Since the maximum load on a tire tread in service is at its crown or center portion, it will be seen that applicants' tread subjects the plow-share-like inner ends of the bars to severe loading, due to the limited surface area of the bars at the center portion of the tread. This heavy load per square inch on the bars, in combination with the plow-share action of the bars, provides an effective tread design in penetrating sod, firm soil and similar surfaces, whereby the bars of the tread sink their full height into the ground, and the bottoms of the grooves of the tread press against the ground thus increasing the shear resisting force of the soil. The present tire is particularly efficient in sod which often is difficult to penetrate with tractor tire traction elements, but which once penetrated does not of itself resist the shearing force set up by the traction elements in a plane parallel with the surface of the sod.

While applicants have avoided the straight, or angular center rib commonly appearing in tractor tires, it is pointed out that the present tire provides a large measure of the advantages of such ribs, without their faults, in that the short legs 20 and 22 of the bars 19 and 21 respectively are so disposed along the crown area of the tire that no wide spacing of the bars occurs at the center line of the tread.

Referring now to Fig. 6 of the drawings, it will be seen that the embodiment of the invention there illustrated provides traction elements 30 and 31 similar to traction elements 13 and 14 of Fig. 5 respectively. The traction elements 30 and 31 comprise long and short legs 32, 33 and 34, 35 respectively. The legs 34 and 35 are shorter relative to the long legs 32 and 33 than is the case in the embodiment of the invention shown in Fig. 1. It is to be noted that the plow-share-like points 36 and 37 of the traction elements, or bars, are blunt. However, the principal feature of the modification illustrated in Fig. 6 is the increased length of the long legs 32 and 33 of the traction elements. It is to be noted that legs 32 and 33 follow an arcuate course from the sides of the tread inwardly to and across the longitudinal center line of the crown of the tread. Also that the legs 32 and 33 alternate circumferentially of the tire.

Figure 7:
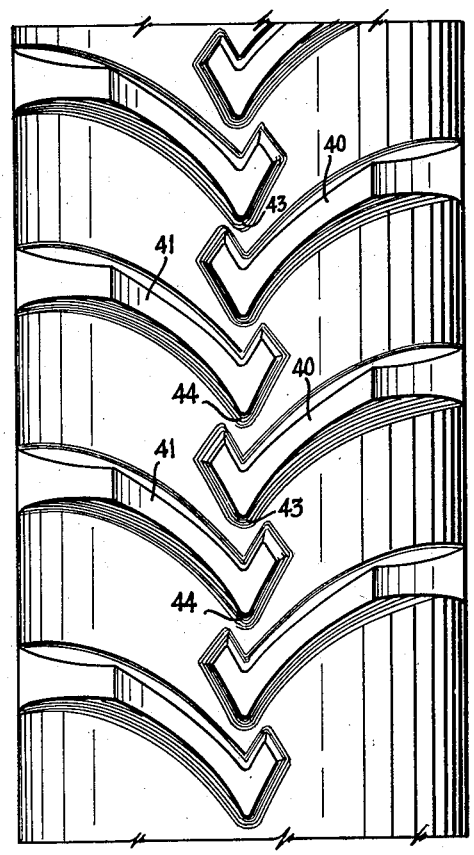
Fig. 7 is the same as Fig. 5 except another modification of the tread design is shown.

Another embodiment of the invention is shown in Fig. 7 wherein traction elements 40 and 41 are similar to the traction elements 30 and 31 respectively of Fig. 6. However, in Fig. 7 it will be noted that the plow-share-like points 43 and 44 of the traction elements terminate at the longitudinal center line of the crown of the tread.

By reference to the drawings, it will be seen that in all embodiments of the invention, at least one traction element will always be in contact with the ground when the tread is running in service. This arrangement of circumferentially overlapping traction elements provides a smooth ride on hard roads, thus prolonging the life of the tread and tire plies, as well as the life of the vehicle.

In all of the embodiments of the invention it will be seen that each of the traction bars have a V-shape, check-mark shape or plow-share form with their points in the crown portion of the tread, said traction elements being so constructed as to provide relatively high tread load per square inch in normal service. It is to be further noted that the traction elements are disconnected and so arranged that when a tire embodying the present invention rotates in service, the forward ends of said elements make successive contacts with sod, or ground, piercing the surface thereof, and starting a breakthrough. This break in the sod or surface of the soil is further developed by the legs of the traction elements as they progressively come to bear on the edges of the break. Thus it will be seen that traction bars of the present invention provide forward ends in the crown area for initially piercing the surface of sod, or soil, and progressively developing such rupture to facilitate the penetration to the full height of the traction bars. Such initial penetration by the forward ends of said bars is strongly resisted by the firmness of the soil, whereby unsupported discontinuous rubber traction bars, as heretofore employed, tend to bend over and become distorted without penetrating the soil. The apices or V-shaped leading ends of the traction bars of the present invention, however, afford support for the legs of the traction bars.

It will be manifest to those skilled in the art that the invention may be modified in detail, without departing from the spirit of the invention, which therefore is to be limited only by the prior art and the scope of the appended claims.

We claim:

1. A tractor tire comprising a body portion and a tread portion formed with a plurality of check mark like traction bars each having an arcuate long arm portion and an arcuate short arm portion integrally joined thereto to form an apex, said traction bars being disposed in plural series, the traction bars of each series having the long arm portions extending from outward portions of the tire body to the central tread area with the apices of the traction bars extending across the center line of the tread area in the direction of tire rotation.

2. An agricultural tractor tire having a tread constructed with two series of circumferentially spaced diagonally disposed traction bars, the bars of one said series being generally on one side of the median plane of the tire, and the bars of the other series on the other side of said median plane, the bars of one series being staggered with relation to the bars of the other series, said bars of each series extending from the lateral marginal edge of the tread diagonally toward the center of the tire in the direction the tire is designed normally to revolve, said bars extending angularly backward a short distance at a point across the center line of the tire to form a plowshare-like dihedral angle, whereby said plowshare-like ends of said bars point in the direction traction effort is being exerted.

3. An agricultural tractor tire having a tread constructed with two series of circumferentially spaced diagonally disposed traction bars, the bars of one series being staggered with relation to the bars of the other series, said bars of each series extending from the lateral marginal edge of the tread diagonally toward the center line of the tire crown in the direction the tire is designed normally to revolve, said bars extending angularly backward a short distance at a point in the crown area of the tire short of the centerline of the tire to form a plowshare-like dihedral configuration, whereby said plowshare-like ends of said bars point in the direction traction effort is being exerted, both extensions of said bars having road contacting surfaces, said bars being of the same height at any points in their road contacting surface which are equal distance from the centerline of the tread.

4. A pneumatic tire having a tread portion comprising sets of bars substantially on opposite sides of the tread but overlapping at their inner end portions, each said bar including a long and a short arm, the long arms of said bars on one side of the tread being positioned in opposite diagonal relation to the long arms of the bars on the other side of the tread relative to the medial plane of the tire so that the long arms of opposite series converge toward each other in the direction in which tractive effort is normally applied, said short arms extending at an angle to the axis of said tire and joining the long arms at the inner ends thereof, the point of juncture of the long and short arms being alternately on one side and the other of the center line of the crown portion of the tire.

5. A traction tire having a tread portion formed with two series of traction bars disposed transversely of the tread, the bars of one of the series being substantially on one side of the tread portion and the bars of the other series being substantially on the opposite side of the tread portion, said bars being curved in a projected flat plane, with the bars in the opposite series being in alternate staggered relation, each of said bars extending from the marginal edge portions of the tread obliquely to the median plane of the tire a first distance to a point on the centerline of the tire tread, and then extending a further distance in a direction at an angle to said first extension, said first distance being greater than the said second distance, the oblique direction of said first extension being in the general direction of tire rotation for forward travel, and the direction of the second extension of the bar continuing generally in a direction counter to that of tire rotation, both extensions of said bars having a road contacting surface, said bars being the same height at all points in their road contacting surface equidistance from the centerline of the tread.

6. A vehicle tire having a tread portion formed with two series of traction bars disposed transversely of the tread, the bars of one of the series being on one side of the tread and the bars of the other series being on the opposite side of the tread, with the bars in the opposite series being in alternate staggered relation, each of said bars extending from the marginal edge portions of the tread obliquely toward the median plane of the tire a first distance into the crown area of the tire tread but short of the center line, and then extending across the center line in a direction at an angle to said first extension, said first distance being greater than the said second distance, the oblique direction of said first extension being in the general direction of forward tire revolution, and the direction of the second extension of the bar being generally in a direction opposite thereto, said bars in each series being circumferentially widely spaced from each other and the corresponding alternate bars of the opposite series being separated at the crown portion of the tire, the height of said bars in the tread surface being the same at all points equal distance from the centerline of the tread.

7. An agricultural tire having a tread portion formed with two series of traction bars disposed transversely of the tread, the bars of one of the series being substantially on one side of the tread and the bars of the other series being substantially on the opposite side of the tread, with the bars in opposite series being in alternate staggered relation, each of said bars having a leg extending from the marginal edge portions of the tread obliquely toward and into the crown portion of the tire, and having a second leg extending from the inner end of said first leg in a direction at an angle to said first leg and at an angle to the axis of said tire and integrally joined thereto to form an apex therewith, said bars having road-contacting surfaces of the same height at points equidistant from the centerline of the tread, said bars providing at the crown portion of the tread road-contacting surface areas spaced substantially closer than the spacing of successive apices whereby to provide a smooth-riding crown portion.

8. A tread for tires of the class described including separate circumferentially spaced traction bars disposed in two series, each of said bars comprising a long arm extending from a marginal edge of the tread in a direction toward and into the crown area of the tread and being generally inclined in a direction of normal rotation of the tire, a short arm joining the inward end of each of said long arms to form an apex therewith, said short arm being generally aligned with the next succeeding long arm, said long and short arms being of the same height at all points equidistant from the centerline of said tread.

9. An agricultural tire having a tread portion formed with two series of traction bars disposed transversely of the tread, the bars of one of the series being substantially on one side of the tread and the bars of the other series being substantially on the opposite side of the tread, with the bars in opposite series being in alternate staggered relation, each of said bars having a leg extending from the marginal edge portions of the tread obliquely toward and into the crown portion of the tire, and having a second leg extending at an angle to the axis of said tire from the inner end of said first leg in a direction at an angle to said first leg and integrally joined thereto to form an apex therewith, said bars having road-contacting surfaces of the same height at points equidistant from the centerline of the tread, said bars providing at the crown portion of the tread road-contacting surface areas spaced substantially closer than the spacing of successive apices whereby to provide a smooth-riding crown portion.

10. An agricultural tire having a tread portion formed with two series of traction bars disposed transversely of the tread, the bars of one of the series being substantially on one side of the tread and the bars of the other series being substantially on the opposite side of the tread, with the bars in opposite series being in alternate staggered relation, each of said bars having a leg extending from the marginal edge portions of the tread obliquely in the direction of rotation of the tire toward and into the crown portion of the tire, and having a second leg extending at an angle to the axis of said tire from the inner end of said first leg in a direction at an angle to said first leg and integrally joined thereto to form an apex therewith, said first leg being substantially longer than the said second leg, said bars having road-contacting surfaces of the same height at points equidistant from the centerline of the tread, said bars providing at the crown portion of the tread road-contacting surface areas spaced substantially closer than the spacing of successive apices whereby to provide a smooth-riding crown portion.

11. A tractor tire comprising a body portion and a tread portion formed with a plurality of checkmark-like traction bars each having a long arm and a short arm extending at an angle to the axis of said tire and integrally joined to said long arm to form an apex, each said bars having road-contacting surfaces of the same surface height at points equidistant from the centerline of said tread portion, said traction bars being formed in two series, the long arms of the traction bars of each series extending from the marginal edge portions of the tread to the crown area of the tread with the apices of the traction bars disposed successively on opposite sides of the center of said crown.

JOSEPH C. EILER.
WALTER E. LYON.

REFERENCES CITED

The following references are of record in the file of this patent:

UNITED STATES PATENTS

| Number | Name | Date |
|---|---|---|
| D. 104,492 | Brunner | May 11, 1937 |
| 1,050,790 | Bawden | Jan. 21, 1913 |
| 1,127,517 | Richardson | Feb. 9, 1915 |
| 2,203,617 | Hale | June 4, 1940 |
| 2,241,227 | Wait | May 6, 1941 |
| 2,324,996 | Coben | July 20, 1943 |
| 2,415,290 | Kreyer | Feb. 4, 1947 |

FOREIGN PATENTS

| Number | Country | Date |
|---|---|---|
| 449,016 | Great Britain | June 15, 1936 |
| 505,994 | Great Britain | May 19, 1939 |